(12) United States Patent
Belleville

(10) Patent No.: US 8,011,613 B2
(45) Date of Patent: Sep. 6, 2011

(54) AIRCRAFT WITH REDUCED ENVIRONMENTAL IMPACT

(75) Inventor: Mathieu Belleville, Bazus (FR)

(73) Assignee: Airbus France, Toulouse (FR)

( * ) Notice: Subject to any disclaimer, the term of this patent is extended or adjusted under 35 U.S.C. 154(b) by 591 days.

(21) Appl. No.: 12/106,485

(22) Filed: Apr. 21, 2008

(65) Prior Publication Data
US 2009/0045287 A1     Feb. 19, 2009

(30) Foreign Application Priority Data
Apr. 23, 2007  (FR) ..................... 07 02922

(51) Int. Cl.
*B64C 1/40*  (2006.01)
*B64C 1/00*  (2006.01)

(52) U.S. Cl. ....... 244/1 N; 244/129.1; 244/55; 244/45 R

(58) Field of Classification Search .................. 244/1 N, 244/55, 45 R, 12.5, 23 D, 129.1, 15, 110 B, 244/110 D, 113, 53 R, 45 A, 3.26, 3.27; D12/319, D12/340
See application file for complete search history.

(56) References Cited

U.S. PATENT DOCUMENTS

| | | | | |
|---|---|---|---|---|
| 3,312,429 A | * | 4/1967 | Hull, Jr. et al. | 244/53 R |
| 3,680,816 A | * | 8/1972 | Mello | 244/46 |
| 3,848,831 A | * | 11/1974 | Geary | 244/45 R |
| 3,936,017 A | * | 2/1976 | Blythe et al. | 244/55 |
| 3,968,944 A | * | 7/1976 | Zimmer et al. | 244/1 N |
| 4,036,452 A | * | 7/1977 | Schairer | 244/1 N |
| 4,243,188 A | * | 1/1981 | DeBlois | 244/1 N |
| 4,447,022 A | * | 5/1984 | Lion | 244/1 N |
| 4,641,800 A | * | 2/1987 | Rutan | 244/45 R |
| 4,966,338 A | | 10/1990 | Gordon | |
| 4,976,396 A | * | 12/1990 | Carlson et al. | 244/55 |
| 5,156,353 A | * | 10/1992 | Gliebe et al. | 244/55 |
| 5,437,419 A | * | 8/1995 | Schmitz | 244/1 N |
| 5,779,191 A | * | 7/1998 | Brislawn | 244/23 D |

(Continued)

FOREIGN PATENT DOCUMENTS

BE     680 443     10/1966
(Continued)

OTHER PUBLICATIONS

Preliminary Search Report dated Dec. 11, 2007 w/ English translation.

*Primary Examiner* — Joshua J Michener
*Assistant Examiner* — Steven Hawk
(74) *Attorney, Agent, or Firm* — Dickinson Wright PLLC

(57) ABSTRACT

An aircraft includes a fuselage and at least one engine provided with at least one propeller and mounted at a rear part of the fuselage, on the back thereof, with the at least one engine having an axis substantially parallel to the longitudinal axis of the fuselage, where the at least one engine is mounted on the rear part of the fuselage so that the propeller lies forward of the tails, and provided at the rear part of the fuselage, symmetrically with respect to the fuselage, are removable noise masking surfaces configured to occupy either a deployed position in which the removable noise masking surfaces project laterally with respect to the rear part of the fuselage and are positioned plumb with the propeller, or a retracted position in which the removable noise masking surfaces are incorporated into the rear part of the fuselage.

9 Claims, 4 Drawing Sheets

U.S. PATENT DOCUMENTS

| | | | |
|---|---|---|---|
| 5,992,796 A * | 11/1999 | Smith | 244/45 A |
| 5,996,729 A * | 12/1999 | Kampf | 181/205 |
| 6,626,401 B2 * | 9/2003 | Fraser | 244/213 |
| D530,658 S * | 10/2006 | Vigneron et al. | D12/319 |
| D592,582 S * | 5/2009 | Tamm et al. | D12/319 |
| D607,806 S * | 1/2010 | Saint-Jalmes et al. | D12/319 |
| D608,720 S * | 1/2010 | Saint-Jalmes et al. | D12/319 |
| 7,819,358 B2 * | 10/2010 | Belleville | 244/55 |
| 2008/0142641 A1 * | 6/2008 | Moore et al. | 244/55 |
| 2008/0191087 A1 * | 8/2008 | Cros | 244/15 |

FOREIGN PATENT DOCUMENTS

| | | |
|---|---|---|
| DE | 102 46 551 | 10/2003 |
| EP | 1 046 577 | 10/2000 |
| FR | 2 619 076 | 2/1989 |
| WO | 2006/108957 | 10/2006 |

* cited by examiner

AIRCRAFT WITH REDUCED ENVIRONMENTAL IMPACT

The present invention relates to an aircraft with reduced environmental impact.

It is known that turboprop engines, with one or more propellers, have better energy efficiency than turbine engines.

However, most existing aircraft are propelled by turbine engines which, on the one hand, are greedy in terms of fuel consumption and, on the other hand, are sources of environmental pollution because of what they discharge into the atmosphere.

As a result, in terms of energy saving and environmental pollution, it would be more advantageous for aircraft to be fitted with turboprop engines rather than turbine engines.

However, in operation, turboprop engines are even noisier than the turbine engines which means that the advantage in terms of energy saving and environmental pollution in terms of what the engine discharges, that could be had by replacing turbine engines with turboprop engines, would be accompanied by the disadvantage of an increase in noise pollution. The noise pollution levels thus reached would be unacceptable and, in any event, difficult to reconcile with the legislation currently in force.

In order to remedy this disadvantage an aircraft has already been proposed in which there are two vertical tails mounted at the ends of the horizontal tail and at least one turboprop engine mounted on the back of said aircraft, with its propeller or propellers positioned between said vertical tails above said horizontal tail. Such a layout undeniably masks at least some of the noise of the propellers in the downward direction (the horizontal tail masks this) and in lateral directions (the vertical tails mask this).

However, in spite of all the precautions that may be taken, there is still the risk that if the propellers break or the turboprop engine explodes, said tails will be at least partially destroyed by debris thrown out radially and that this could, potentially, cause the aircraft to be lost.

It is an object of the present invention to remedy this disadvantage.

To this end, according to the invention, the aircraft with reduced environmental impact comprising:
  a fuselage, which has a longitudinal axis and the rear part of which carries a horizontal tail and at least one vertical tail, and
  at least one engine provided with at least one propeller and mounted at said rear part of the fuselage, on the back thereof, with its axis at least substantially parallel to said longitudinal axis of the fuselage,
is notable:
  in that said engine is mounted on said rear part of the fuselage in such a way that said propeller lies forward of said tails; and
  in that provided at said rear part of the fuselage, symmetrically with respect to said fuselage, are removable noise masking surfaces capable of occupying:
    either a deployed position in which they project laterally with respect to said rear part of the fuselage and are positioned plumb with said propeller;
    or a retracted position in which they are incorporated into said rear part of the fuselage.

Thus, by virtue of such a provision of the present invention, because in the deployed position said removable surfaces are positioned under the propeller or propellers, at least some of the noise emitted by the propellers can be masked in the downward direction without the fear of the tails being destroyed. Because said removable noise masking surfaces play no structural role, their potentially being destroyed by radial debris would have no dangerous effect on the aircraft.

It will additionally be observed that deploying said removable noise masking surfaces can be performed only when needed, that is to say near the ground, during landing and takeoff phases. In the other phases of flight, said removable surfaces can remain in their retracted position so that they do not detract from the performance of the aircraft.

The effectiveness of said removable noise masking surfaces is due to the fact that the noise made by a propeller is highly directional, the maximum noise being perceived near the plane of the propeller and said noise reducing sharply with distance away from this plane. Now, in the present invention, said propeller plane intersects said removable noise masking surfaces in their deployed position.

It is advantageous for said propeller(s) to be positioned at the rear of said engine and to be able to exert thrust on said aircraft. Thus, the propeller or propellers is (are) located at a site where the aircraft fuselage has a smaller cross section, thus leaving more space for installing it (them). In addition, the propeller(s) is/are thus kept away from the passenger cabin, and this is advantageous to passenger comfort.

In addition, in order to limit the fuel consumption of the engine as far as possible, it is preferable for said propeller(s) to have no peripheral cowling.

Furthermore, it is known that, of all known turboprop engine designs, those which have two contra-rotating propellers (generally known by the name of "contra-rotating prop fans") are particularly advantageous in terms of propulsion efficiency, on the one hand, and radial size on the other. Indeed, a turboprop engine with two contra-rotating propellers has, for the same power, a propeller diameter at least 25% smaller than that of a single-propeller turboprop engine, thus making it even easier to incorporate said engine into the rear part of the aircraft.

Hence, according to one particular feature of the present invention, said engine comprises two contra-rotating coaxial propellers and said removable noise masking surfaces are, in the deployed position, positioned plumb with said two coaxial propellers.

Said removable noise masking surfaces may be planar or curved.

When they are planar, it is advantageous for said planar removable noise masking surfaces to be able to move in terms of sliding in their plane and for them to be, in the retracted position, housed inside said rear part of the fuselage. In this case, they therefore pass through the wall of said rear part of the fuselage in order to move from the retracted position into the deployed position and from that position into said retracted position.

When they are curved, said removable noise masking surfaces are advantageously able to move in terms of rotation and, in the retracted position, are pressed against said rear part of the fuselage. In this case, they may be entirely external to said rear part and require no passage through the wall of said rear part of the fuselage. The dynamics involved in deploying and retracting said removable surfaces may be such that it is either the convex or the concave face thereof which, in the deployed position, faces said propeller(s).

Of course, the aircraft according to the present invention may be a single-engine aircraft and have just one propeller(s) engine mounted at the rear in the way described hereinabove. However, in addition to the latter engine, there may also be at least two turbine engines carried symmetrically by the wings of said aircraft. An arrangement such as this is advantageous in that the tail-mounted propeller engine, which consumes little fuel and creates little noise because of the noise-proofing mask according to the invention, can be used to reduce the power (and therefore the noise and fuel consumption) of the turbine engines.

However, in one preferred embodiment of the aircraft according to the present invention, two propeller(s) engines are provided, these being positioned one beside the other with their axes parallel.

The figures of the attached drawing will make it easier to understand how the invention may be embodied. In these figures, identical references denote elements which are similar.

FIGS. 1 and 2 schematically illustrate one embodiment of the aircraft according to the present invention, viewed from the front and viewed from above, respectively.

Figure 2:
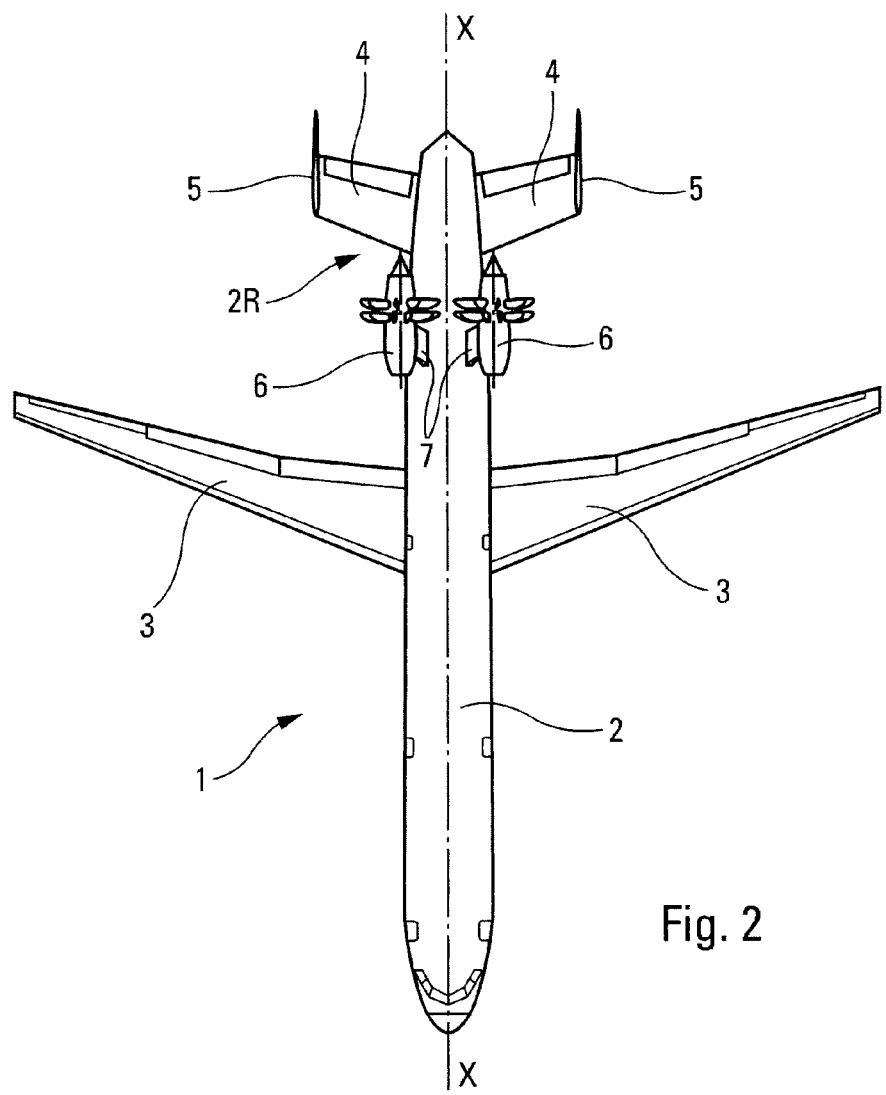
Figure 1:
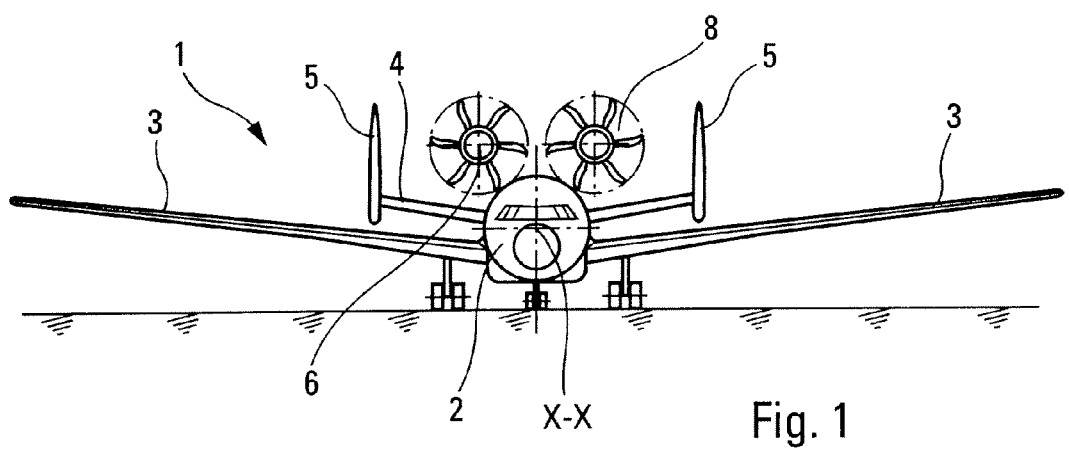

The commercial airplane 1, according to the invention and depicted schematically in FIGS. 1 and 2, comprises a fuselage 2 of longitudinal axis X-X, wings 3, a horizontal tail 4 and two vertical tails 5 positioned at the ends of the horizontal tail 4.

Mounted at the rear of the airplane 1 are two propeller engines 6, positioned on the back of said airplane with their axes L-L parallel to the longitudinal axis X-X. The engines 6 are carried by pylons 7 (see also FIG. 3) and are positioned side by side. On the back, each engine 6 comprises two unducted thrust generating contra-rotating propellers 8, 9.

At the rear part 2R of the fuselage 2, the propellers 8 and 9 of the two engines 6 are positioned forward of said horizontal 4 and vertical 5 tails.

Figure 3:
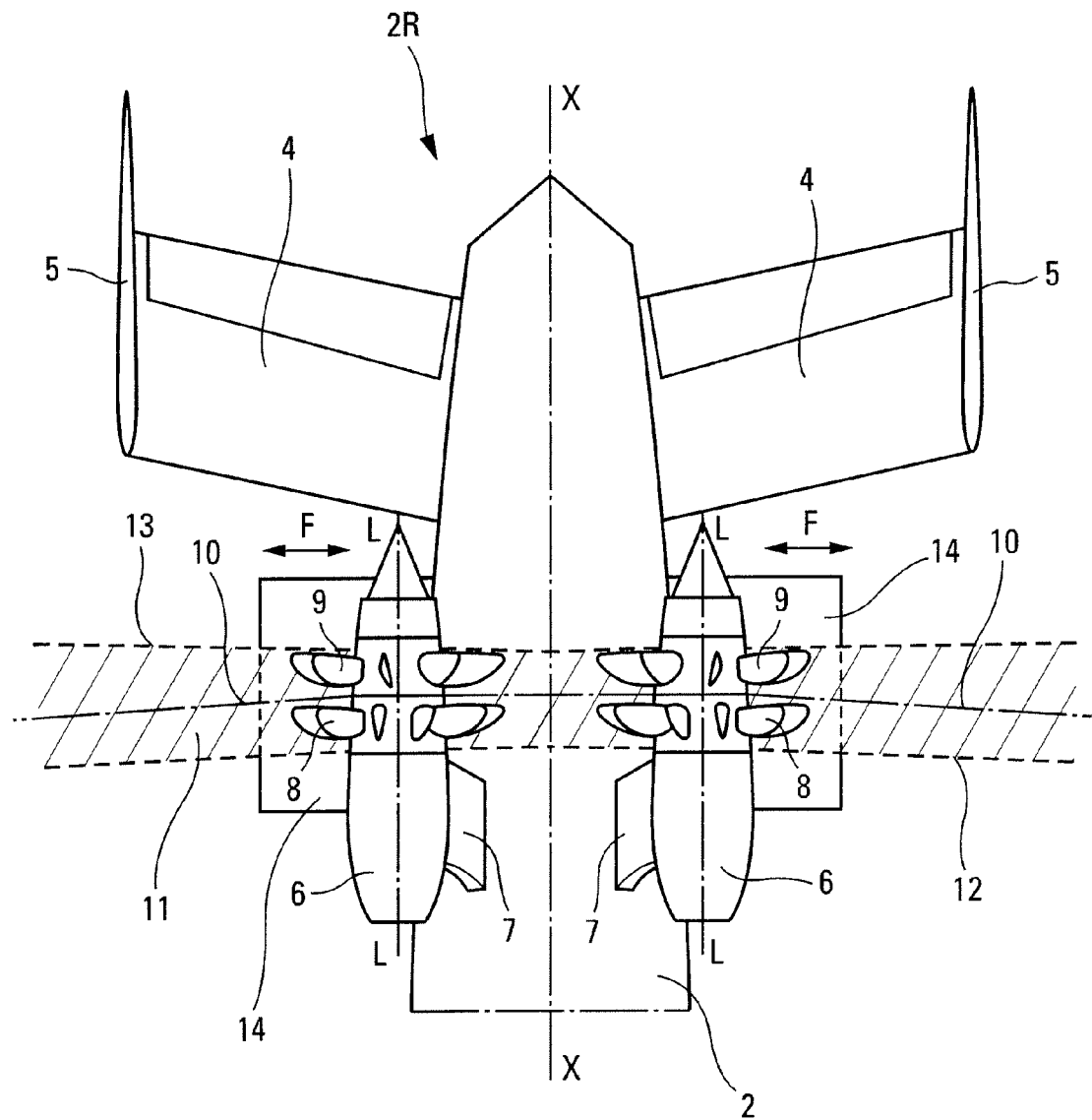
FIG. 3 is a schematic view from above, on a larger scale, of the rear part of the aircraft of FIGS. 1 and 2.

In operation, each of said propellers 8 and 9 generates a noise the acoustic intensity of which is at a maximum near its plane and decreases rapidly away from this plane along the axes L-L. In this instance, the two pairs of propellers 8 and 9 generate, about said axes L-L, an overall noise the maximum acoustic intensity of which is a substantially planar surface 10 passing between the propellers 8 and 9 of each pair, as depicted in FIG. 3. The latter figure also depicts a noise zone 11, defined by a forward limit 12 and a rear limit 13, which limits are positioned one on each side of the surface 10 of maximum acoustic intensity and at which limits the acoustic intensity is, for example, equal to −5 dB with respect to said maximum acoustic intensity.

According to the present invention, in order to mask the noise emitted by the propellers 8, 9 of the engines 6, at least partly in the downward direction, two removable noise masking surfaces 14 are provided, these being positioned symmetrically to one another with respect to the fuselage 2. The removable noise masking surfaces 14 may occupy a deployed position (as in FIG. 3) in which they project laterally with respect to the rear part 2R of the fuselage 2 and are positioned plumb with the propellers 8 and 9. Thus, when said surfaces 14 are in the deployed position, the noise zone 11 impinges on these surfaces which block the downward propagation of said noise.

As a result, if said removable surfaces 14 are deployed during takeoff and landing, the noise emitted down toward the ground by the engines 6 of the airplane 1 is greatly reduced because it is masked by said removable surfaces.

The removable surfaces 14 may also adopt a retracted position (not visible in FIG. 3) in which they form an integral part of said rear part 2R of the fuselage 2. The removable surfaces 14 may, on demand, be moved from their retraced position to their deployed position and vice versa as symbolized by arrows F in FIG. 3.

FIGS. 4 to 7 respectively show examples 14.1 to 14.4 of removable noise masking surfaces 14. To make the drawings clearer, these exemplary embodiments are illustrated schematically because it will be readily understood how they can be embodied using simple components such as slideways, slides, hinges, actuators, etc.

Figure 4:
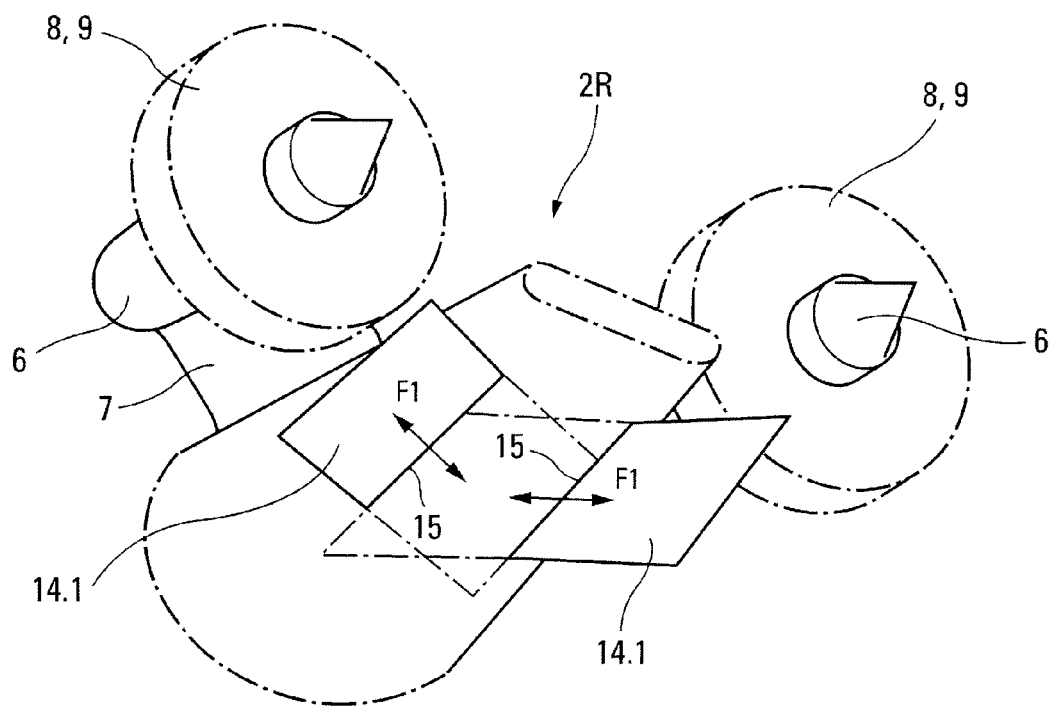
FIGS. 4 and 5 illustrate, in perspective views from beneath, two rear parts of aircraft (without the tails) respectively provided with two embodiments of removable noise masking surfaces according to the present invention, said surfaces being planar, slideable and retractable into said rear parts.

In the exemplary embodiment of FIG. 4, symmetric removable noise masking surfaces 14.1 are planar and can slide in their planes, which are parallel. They slide one over the other in the manner of a pair of scissors. In the retracted position (depicted in chain line), they are housed inside the rear part 2R of the fuselage 2 and can occupy the entire width thereof. In the deployed position (depicted in solid line) they project out from said rear part and are positioned under the propellers 8, 9. They move from their retracted position into their deployed position and vice versa (see arrows F1) through the skin of the fuselage 2 in slots 15. On their outer edge, the removable surfaces 14.1 may be fitted with surfaces (not depicted) capable, when said removable surfaces 14.1 are in the retracted position, of closing off said slots 15 and ensuring the aerodynamic continuity of said skin of the fuselage. In order to allow them to slide between their retracted and deployed positions, said removable surfaces 14.1 may be mounted on slideways (not depicted) and actuated by mechanical, hydraulic or electrical actuators (also not depicted).

Figure 5:
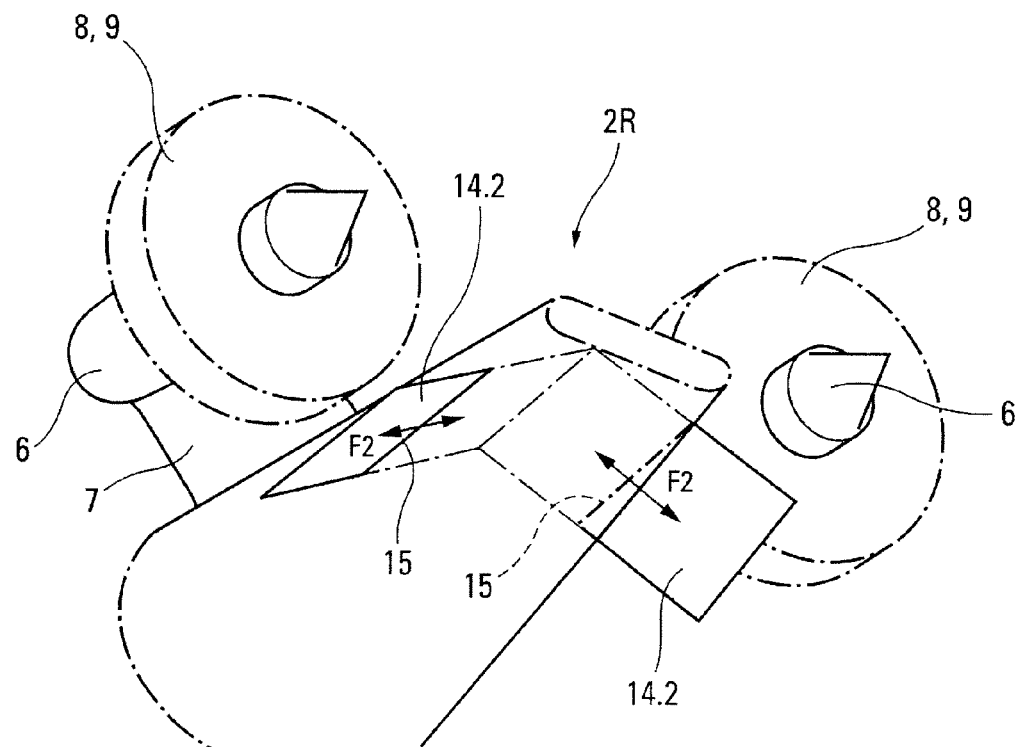

The exemplary embodiment of FIG. 5 is similar to that of FIG. 4 and can be embodied in a similar way. The symmetric removable noise masking surfaces 14.2 are planar and can slide in their planes (arrows F2) through the skin of the rear part 2R through slots 15; however, their planes are no longer parallel but inclined symmetrically to one another with respect to the fuselage 2. In the deployed position (depicted in solid line), the removable surfaces 14.2 project out from said rear part 2R and are positioned under the propellers 8, 9. In the retracted position (depicted in chain line), the removable surfaces 14.2 are respectively positioned between the longitudinal mid-plane of the fuselage 2 and the wall thereof, giving a great latitude for choosing the orientation of the direction F2 in which said removable surfaces 14.2 perform their sliding movement and therefore for choosing the orientation of these surfaces in the deployed position.

Figure 6:
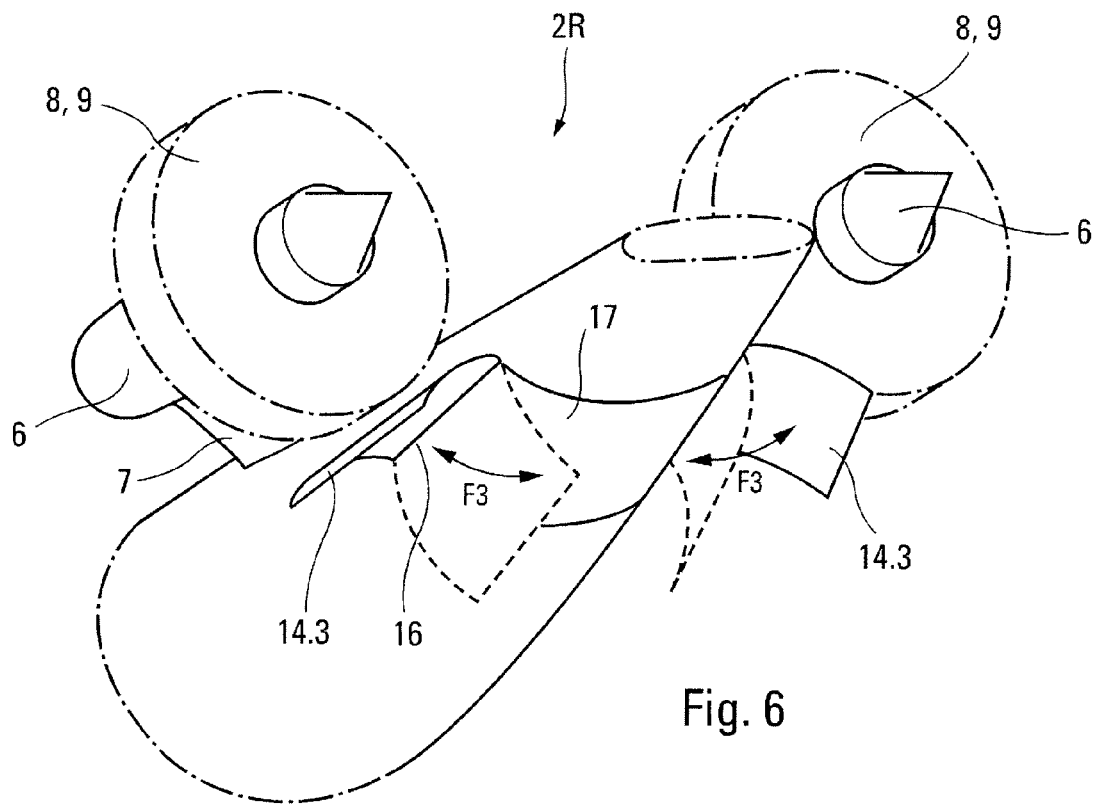
FIGS. 6 and 7 illustrate, viewed in perspective from beneath, two rear parts of aircraft (without the tails) respectively provided with two embodiments of removable noise masking surfaces according to the present invention, said surfaces being curved, rotary and able to be pressed against the fuselage in the retracted position.

In the exemplary embodiment of FIG. 6, the symmetric removable noise masking surfaces 14.3 are curved, external to the rear part 2R and hinged to the fuselage by at least approximately longitudinal hinges 16 positioned along their external edges. Thus, said removable surfaces 14.3 are able to rotate in the manner of a landing gear door (under the action of link rods, actuators, etc. which have not been depicted) between a retracted position in which they are pressed against said rear part 2R and a deployed position in which they are positioned under said propellers 8, 9. In the retracted position, said removable surfaces 14.3 are advantageously housed in a shallow superficial recess 17 in the skin of said rear part 2R, the shape of which recess corresponds to the imprint of said removable surfaces 14.3.

Figure 7:
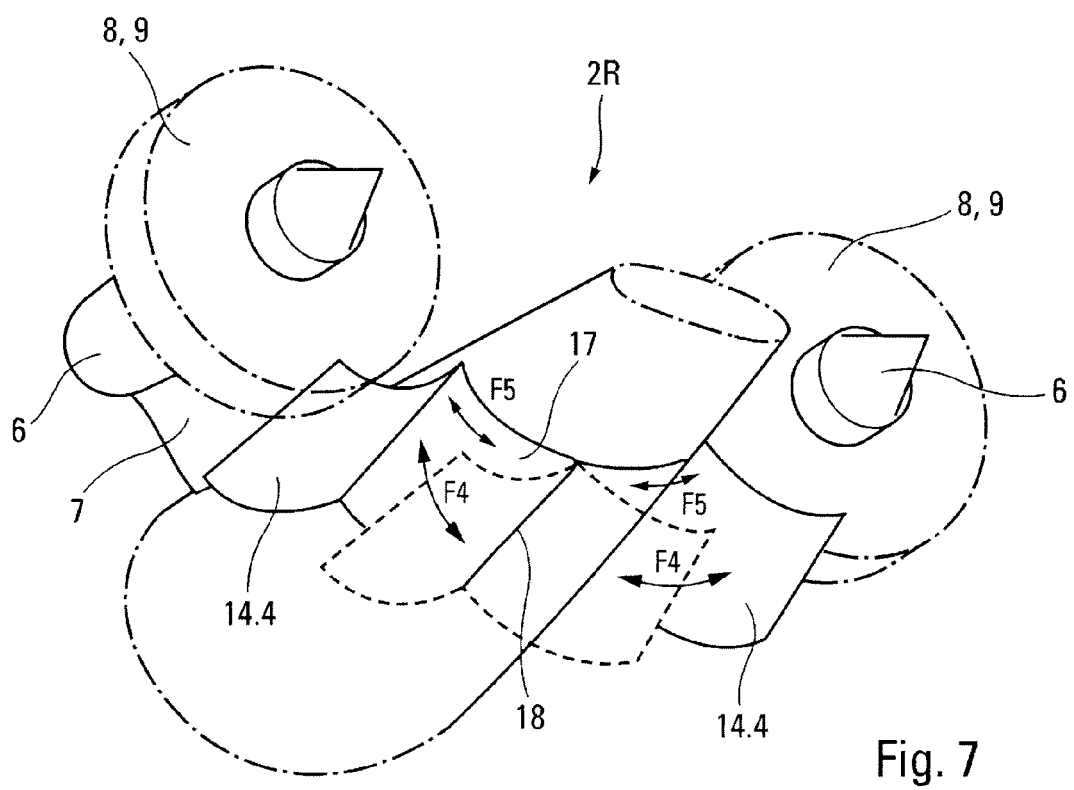

In the exemplary embodiment of FIG. 7, which is similar to that of FIG. 6, the removable noise masking surfaces 14.4 are also curved and hinged. However, in this example, the hinges 18 about which the removable surfaces 14.4 are articulated lie one beside the other when these surfaces are in their retracted position, along the internal edges of said surfaces 14.4. In addition, said hinges 18 can move so that once said surfaces 14.4 have been opened out by rotation (see arrows F4 and the positions in dotted line), said surfaces 14.4 can, by curved sliding or using link rods, be brought under said propellers 8, 9 (see arrows F5) with their concave face facing these propellers. In the retracted position, said removable surfaces 14.4 are housed in a superficial recess 17 as described hereinabove.

The invention claimed is:

1. An aircraft with reduced environmental impact comprising:
    a fuselage, which has a longitudinal axis and a rear part which carries a horizontal tail and at least one vertical tail, and
    at least one engine provided with at least one propeller and mounted at said rear part of the fuselage, on the back thereof, having an axis substantially parallel to said longitudinal axis of the fuselage,
    wherein:
    said engine is mounted on said rear part of the fuselage so that said propeller lies forward of said tails; and
    provided at said rear part of the fuselage, symmetrically with respect to said fuselage, are removable noise masking surfaces configured to occupy:
    a deployed position in which the removable noise masking surfaces project laterally with respect to said rear part of the fuselage and are positioned plumb with said propeller; and
    a retracted position in which the removable noise masking surfaces are incorporated into said rear part of the fuselage.

2. The aircraft as claimed in claim 1, wherein said propeller is positioned at the rear of said engine and is able to exert thrust on said aircraft.

3. The aircraft as claimed in claim 1, wherein said propeller has no peripheral cowling.

4. The aircraft as claimed in claim 1, wherein said engine comprises two contra-rotating coaxial propellers, said removable masking surfaces being, in the deployed position, positioned plumb with said two coaxial propellers.

5. The aircraft as claimed in claim 1, wherein said removable noise masking surfaces are planar.

6. The aircraft as claimed in claim 5, wherein said planar removable noise masking surfaces are able to move in terms of sliding in respective planes of said planar removable noise masking surfaces and wherein, in the retracted position, said planar removable noise masking surfaces are housed inside said rear part of the fuselage.

7. The aircraft as claimed in claim 1, wherein said removable noise masking surfaces are curved.

8. The aircraft as claimed in claim 7, wherein said curved removable noise masking surfaces are able to move in terms of rotation and wherein, in the retracted position, said curved removable noise masking surfaces are pressed against said rear part of the fuselage.

9. The aircraft as claimed in claim 8, wherein, in the deployed position, said curved removable noise masking surfaces are positioned in such a way that concave sides of said curved removable noise masking surfaces face toward said propeller.

* * * * *